Figure 1:
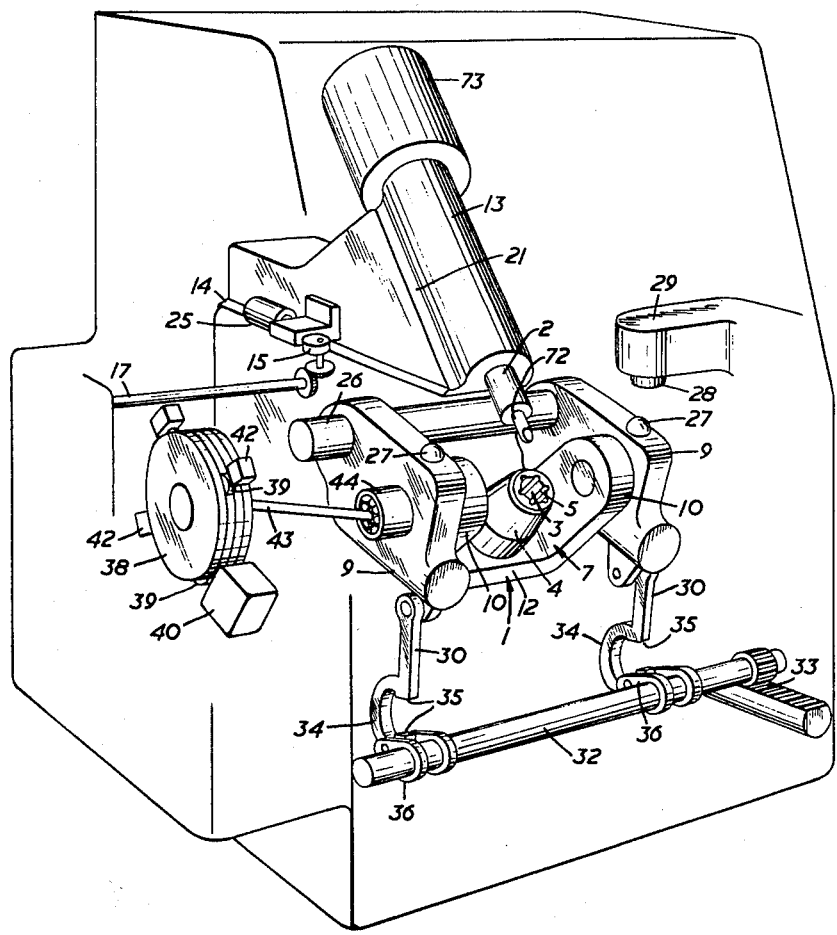

March 16, 1965   W. CULL   3,173,336
MACHINE FOR MILLING ARCUATE GROOVES
Filed Sept. 10, 1962   5 Sheets-Sheet 1

INVENTOR
WILLIAM CULL
BY
Irwin S. Thompson
ATTORNEY

INVENTOR
WILLIAM CULL
BY
Irwin S. Thompson
ATTORNEY

March 16, 1965  W. CULL  3,173,336
MACHINE FOR MILLING ARCUATE GROOVES
Filed Sept. 10, 1962   5 Sheets-Sheet 3

INVENTOR
WILLIAM CULL
BY
Irwin S. Thompson
ATTORNEY

March 16, 1965 W. CULL 3,173,336
MACHINE FOR MILLING ARCUATE GROOVES
Filed Sept. 10, 1962 5 Sheets-Sheet 5

INVENTOR
WILLIAM CULL
BY
ATTORNEY

United States Patent Office 3,173,336
Patented Mar. 16, 1965

3,173,336
MACHINE FOR MILLING ARCUATE GROOVES
William Cull, Four Oaks, Sutton Coldfield, England, assignor to Birfield Engineering Limited, London, England, a company of Great Britain
Filed Sept. 10, 1962, Ser. No. 222,589
Claims priority, application Great Britain, Sept. 21, 1961, 33,747/61
21 Claims. (Cl. 90—15.1)

This invention relates to machine tools, and in particular to a workhead in or for a machine tool which enables a workpiece to be machined along an arcuate cutting path.

Workpieces commonly have to be machined along an arcuate cutting path, an example being the ball tracks machined in the inner and outer members of a ball-type constant velocity universal joint. The milling and/or grinding of such ball tracks has previously been effected by maintaining rotary cutting or grinding means stationary in the cutting sense and rocking a workhead on which the workpiece is mounted in a horizontal plane. Generation of the arcuate track form is accomplished by rocking the workhead about the theoretical centre of the track arc, the workhead being mounted in horizontal arcuate slides or guides.

With the above arrangement considerable power is required to accelerate the heavy workhead on the horizontal slides, to maintain a steady traversing speed during cutting and to decelerate the workhead at the end of each traverse. When machining the inner and outer members of a constant velocity universal joint the clearance space at the ends of the ball tracks, which is the maximum space available for acceleration and deceleration of the workhead at the beginning and end of each cut, is very limited. In addition, the horizontal slides are subject to heavy wear which makes it difficult to maintain the required machining accuracy over a long production run.

The object of the invention is to provide a workhead which will enable an arcuate groove or track to be machined with a rotary milling cutter or the like rotating about a fixed axis, and which in use requires less operating power than previous arrangements while maintaining a high degree of accuracy over very long production runs.

To this end the workhead of the invention is mounted for swinging movement about a substantially horizontal axis above the centre of gravity of the workhead, the arrangement being such that a workpiece which is to be machined along an arcuate cutting path can be mounted on the workhead with the theoretical centre of said path located on said horizontal axis, and power-operated means are provided to produce controlled swinging movement of the workhead during a machining operation.

It will be appreciated that the workhead has a natural tendency to swing after the manner of a pendulum, and the power-operated means are preferably so arranged that the workhead swings at or close to its natural frequency when considered as a pendulum, so that power requirements are reduced to a minimum. Although acceleration and deceleration of a freely swinging pendulum is a sine function, relatively little power is necessary to augment the natural pendulum movement so that a constant traversing speed is obtained during the cutting cycle and to obtain the necessary rapid acceleration and deceleration at the ends of each traverse.

Apart from the lower power requirements and the high accuracy which is maintained for long production runs, this accuracy resulting from the relatively low rate of wear of horizontal trunnions on which the workhead is mounted as compared with the horizontal arcuate slides or guides on prior arrangements, a workhead in accordance with the invention has the further advantage that the swinging movement about the horizontal axis ensures very smooth operation as compared with the use of horizontal arcuate slides. In addition, the trunnions can be arranged to provide very rigid location of the workhead.

The power-operated means are conveniently hydraulic in operation, and they may comprise a hydraulically operated rack which meshes with a pinion on the workhead. Control of the racks may be achieved using a hydraulic or electro-hydraulic control circuit embodying a control drum driven by and turning with the workhead. This drum is preferably mounted in rigid bearings to one side of the workhead and driven by the latter through a drive shaft embodying constant velocity universal joints.

Preferably the workhead is in the shape of a yoke with the intermediate limb of the yoke formed with a work-holding fixture for mounting the workpiece between the two side limbs on which the workhead trunnions are mounted. To enable the yoke to be retracted away from the cutting or grinding spindle, which is fixed in the cutting sense and need only be movable to provide the necessary feed for the spindle and to enable the machine to be set up, the yoke may be mounted to swing between two links which can themselves swing about a further horizontal axis between a retracted position and an operative or machining position. In the operative position these links may be located in position by a toggle arrangement against stops provided with a preset adjustment. In order to provide accurate and rigid location in the operative position, the toggle arrangement is preferably preloaded so that the two links are held with a predetermined force against the locating stops.

Figure 2:
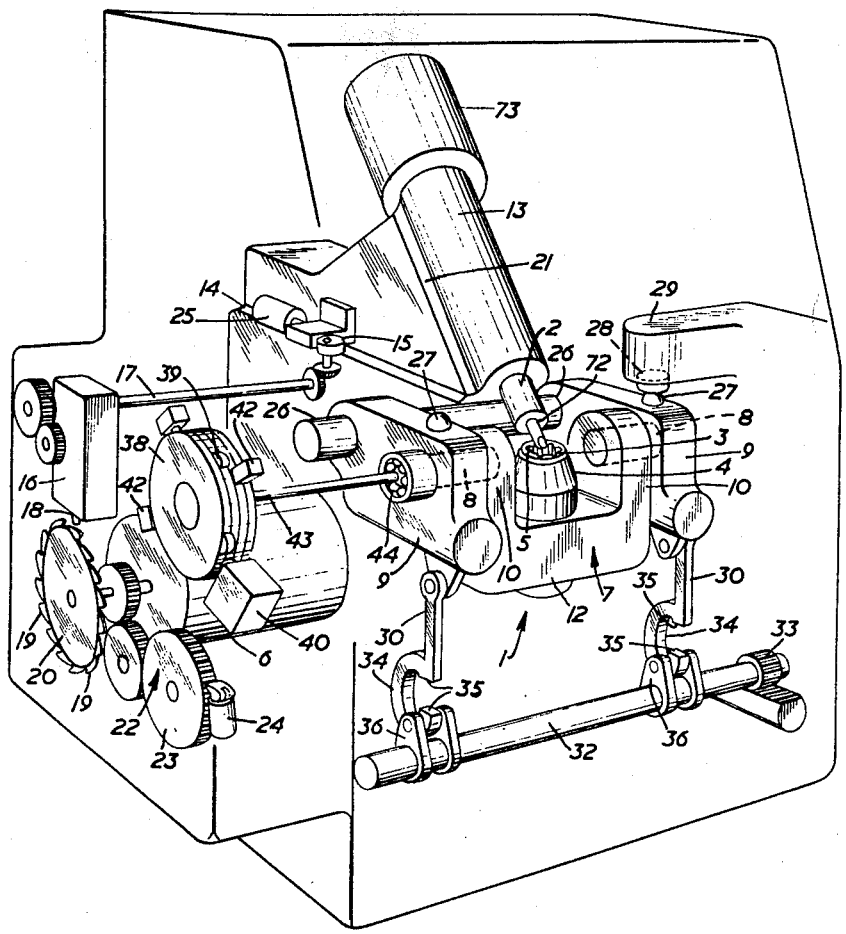
Figure 3:
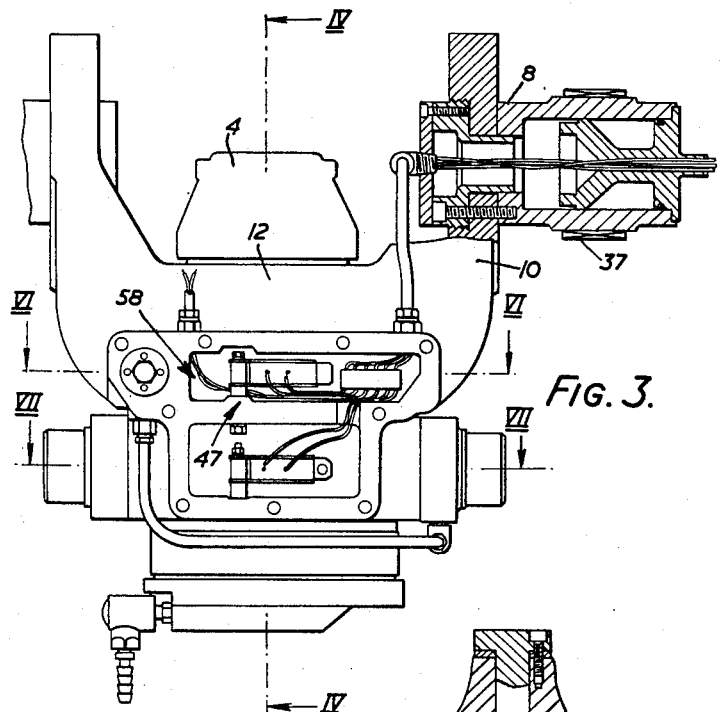
Figure 5:
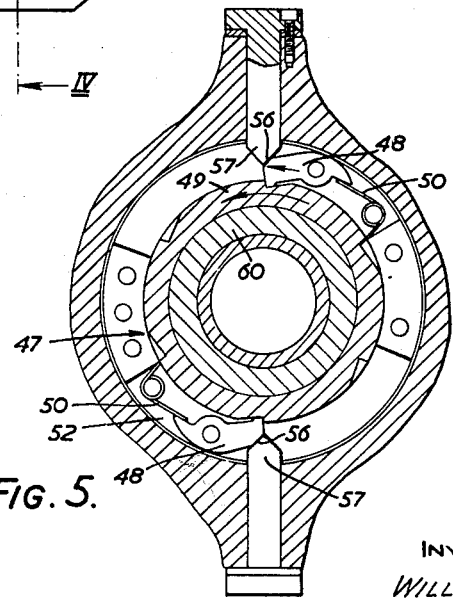
Figure 4:
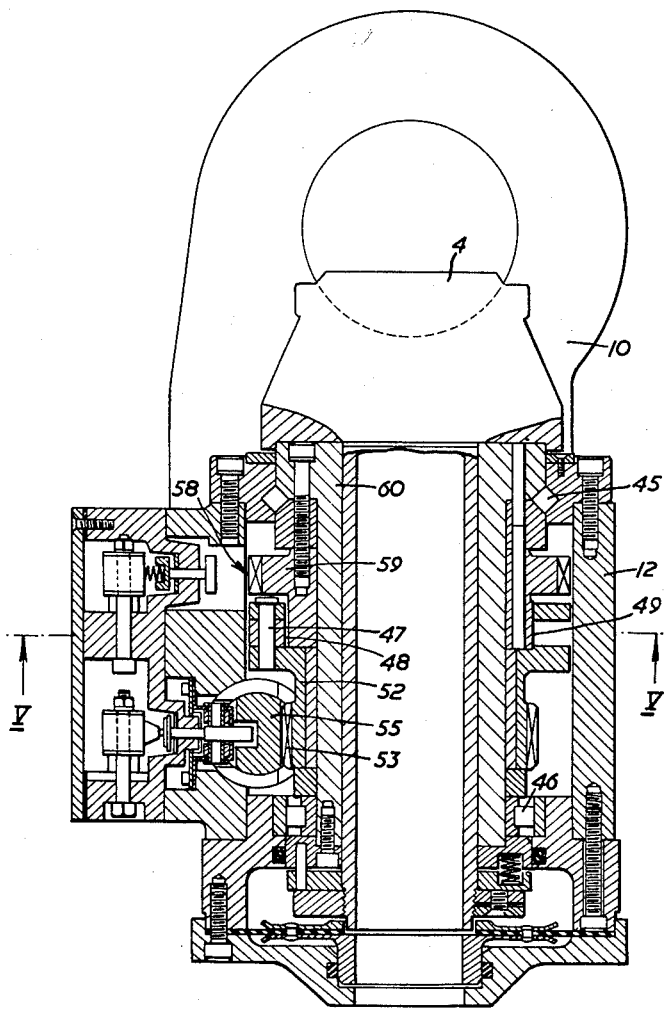
Figure 6:
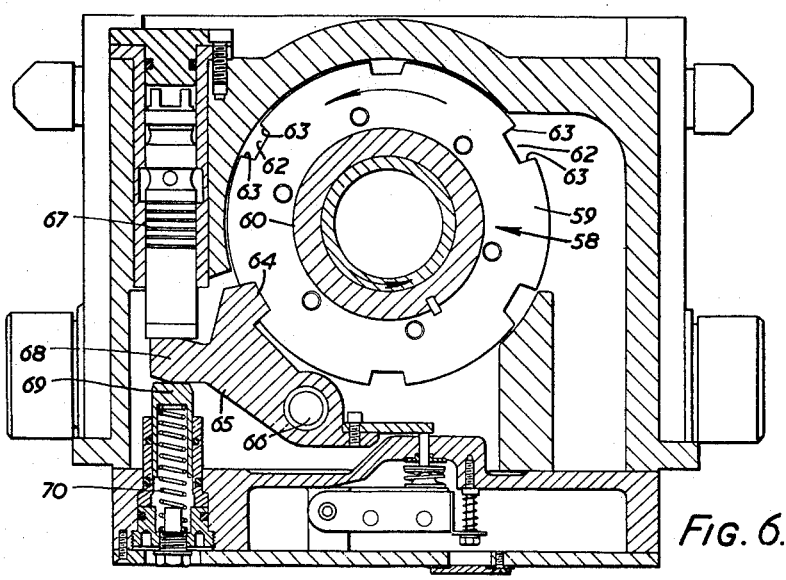
Figure 7:
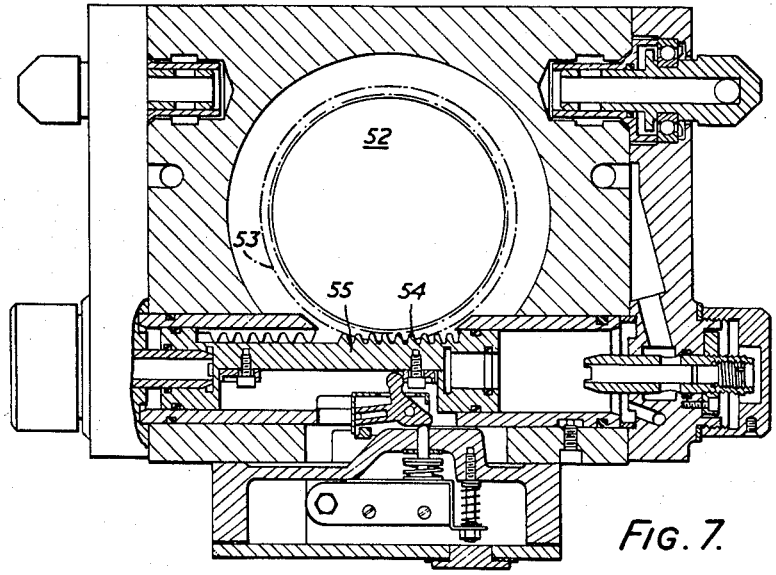

The invention will now be further described with reference to the accompanying drawings which illustrate, by way of example, a machine tool embodying a workhead in accordance with the invention for milling or grinding the ball tracks in the inner and outer members of a ball-type constant velocity universal joint. In the drawings:

FIGURE 1 is a diagrammatic perspective view showing the workhead in a retracted position, FIGURE 2 is a generally similar view showing the workhead in the operative position, FIGURE 3 is a front view of the workhead itself, partly sectioned, FIGURE 4 is a sectional view on the line IV—IV in FIGURE 3, FIGURE 5 is a sectional view on the line V—V in FIGURE 4, FIGURE 6 is a sectional view on the line VI—VI in FIGURE 3, and FIGURE 7 is a sectional view on the line VII—VII in FIGURE 3.

When the machine tool is not in operation the workhead 1 is as shown in FIGURE 1 arranged in a retracted position clear of a cutter spindle 2 to enable the workpiece 3 to be mounted on a work-holding fixture 4 of the workhead. On starting the machine tool the workhead 1 is first moved to the operative or machining position as shown in FIGURE 2 in which it is located in a manner described hereinafter, after which machining of six equiangularly arranged arcuate ball tracks such as 5 in the workpiece 3 is achieved automatically by programme control means.

The control means have four important functions; firstly the control of the feed of the cutter spindle 2; secondly generation of the traversing movement of the workhead 1 which occurs after the manner of a pendulum as will be described; thirdly indexing the work holding fixture 4 so that when one ball track 5 has been completed the fixture 4, and hence the workpiece 3, are indexed to the requisite position to machine the next ball track 5; and fourthly retraction of the workhead 1 to its retracted position after the last ball track 5 has been machined so that the workpiece 3 is again clear of the cutter spindle 2 and can be removed by the operator.

The complete operative cycle of the machine tool is automatically controlled by electro-hydraulic means, and the complete cycle of operation is programmed by a suitable programme drum 6 of the control means which is fitted with appropriate cams to operate micro-switches selectively. The control means themselves form no part of the invention and are only illustrated in sufficient detail to make clear the present description of the operation of the machine tool. The control means utilise hydraulic power cylinders to achieve all the rotary and intermittent rotary movements through rack and pinion mechanisms, as will be described.

The workhead 1 is in the form of a yoke 7 which swings in a vertical plane disposed fore-and-aft of the machine on two large trunnion bearings 8 between two generally horizontal links 9. The horizontal axis of the trunnion bearings 8 is well above the centre of gravity of the workhead 1 so that the latter swings between the links 9 in the manner of a pendulum if free to do so, and takes up a natural balanced or rest position with the side limbs 10 of the yoke 7 substantially vertical. In this position the upper surface of the intermediate limb 12 of the yoke is substantially horizontal and on this surface is mounted the work holding fixture 4 which can be indexed about a vertical axis, considering the workhead 1 in the rest position, to produce indexing movement of the workpiece 3.

The cutter spindle 2 is mounted so that the rotational axis of the spindle is inclined at 30° to the vertical, the spindle being mounted in a cutter head 13 for controlled feeding movement on straight horizontal slides 14 in a direction fore-and-aft of the machine. In-feed movement of the cutter head 13 along the horizontal slides 14 is controlled by a feed cam 15 turned by a rack and a pinion mechanism operated by a hydraulic servo motor of the control means, the latter mechanism and the servo motor being contained in a housing 16. The mechanism is connected to the cam 15 through a geared drive 17, and a servo valve 18 controlling the servo motor is itself controlled by contoured cams such as 19 on a subsidiary drum 20 (see FIGURE 2) synchronized with the main programme drum 6. Both the drums 6 and 20 are driven through a gear train 22 from a large gear 23 of the train which acts as a ratchet and receives impulses from a hydraulically operated pawl 24.

To ensure steady and positive feeding movement of the cutter head 13, a hydraulic ram 25 urges the head in the feed direction (forwards) against the feed cam 15, which acts as a positive and progressively retracting stop, and against two small subsidiary hydraulic rams (not illustrated). The subsidiary rams are spring-loaded as a safety factor against hydraulic failure and provide for quick retraction of the cutter head 13 at the end of each track cutting cycle. To facilitate initial setting up, the head 13 is mounted on inclined slides 21 parallel with the spindle 2 which provide a suitable range of adjustment.

In order to allow the workhead 1 to be swung downwardly and rearwardly to the retracted position of FIGURE 1 away from the cutter for loading and unloading of the workpiece 3, the horizontal links 9 are pivotally mounted at 26 about a horizontal axis parallel to and disposed rearwardly of the axis of the trunnion bearings 8. A hemispherical stop member 27 is mounted on each link 9 immediately above the corresponding trunnion bearing 8, and in the operative position as shown in FIGURE 2 each of the members 27 seats in a coned seating forming a stop such as 28 on the rigid frame 29 of the machine. A shim adjustment (not shown) is provided for each stop 28 so that the operative position of the workhead 1 can be accurately adjusted, and each link 9 is controlled through a toggle linkage 30 by a crankshaft 32 mounted horizontally and laterally of the machine tool below the workhead 1. Intermittent rotary movement of the crankshaft 32 to raise and retract the workhead 1 is achieved by a hydraulically operated rack and pinion mechanism 33 controlled by the control means.

To ensure that the workhead 1 is not only accurately located but also rigidly held in the operative position the toggle linkages 30 are preloaded when the toggles are extended. To this end one of the toggle links of each toggle linkage 30 has a C-shaped portion 34, this portion being compressed when the toggle linkage goes over centre to the extended position shown in FIGURE 2. Measuring pads 35 are formed in each jaw of the C-shaped portion 34 of the toggle link which is of adjustable length, although the adjustment is not shown in the diagrammatic FIGURES 1 and 2. The length is adjusted so that the maximum eccentricity of the corresponding crank 36 of the crankshaft 32 is in line with the link centres when the toggle linkage is extended and the jaws of each C-shaped portion 34 are sprung together. In the machine described a compression of each toggle linkage which produces a closing movement of the jaws of each C portion 34 of 0.006″ produces a preload on the stops 28 locating the workhead of 1,000 lbs.

To produce the necessary generating movement of the workpiece 3 the latter is mounted on the workhead 1 so that the theoretical centre of a ball track 5 to be machined is positioned on the trunnion bearing axis. The workhead 1 swings through 40° on either side of the resting vertical position, and swinging movement is achieved by a pair of hydraulically operated rack and pinion assemblies respectively associated with the two side limbs 10 of the yoke. The latter assemblies are not illustrated in detail in the drawings, only one of the pinions 37 being shown in FIGURE 3 attached to the workhead 1. It will be seen that each pinion 37 is formed as an integral extension of the adjacent trunnion 8.

The workhead 1 is arranged to swing at or close to the natural frequency of the workhead considering it as a freely swinging pendulum, the swinging movement being controlled through the rack and pinion mechanisms so that rapid acceleration and deceleration occurs at the beginning and end of each cut respectively, and so that the traversing speed is substantially constant throughout the cut. By utilising the natural tendency of the workhead 1 to swing as a pendulum, only a relatively small amount of power is required to produce the necessary control of the swinging movement.

Control of the rack and pinion mechanisms of the workhead 1 is achieved by a control circuit embodying a control drum 38 driven by and turning with the workhead 1. The drum 38 is formed with control cams such as 39, some of which operate hydraulic valves such as 40 of the control circuit directly while the others control microswitches such as 42 which in turn operate solenoid valves (not shown) of the control circuit. The bearings of the control drum are mounted on the rigid machine frame 29, the drum 38 being coaxial with the trunnion bearings 8 when the latter are in the operative position. To allow for retraction of the workhead 1 and to ensure uniform motion of the control drum 38 relatively to the workhead 1, the drum 38 is driven by the workhead 1 through a drive shaft 43 embodying two constant velocity universal joints such as 44.

The work holding fixture 4 (see particularly FIGURE 4) is mounted in anti-friction bearings 45 and 46 on the intermediate limb 12 of the yoke 7, and a rack operated pawl and ratchet mechanism 47 is ararnged to index 4 to six equiangularly arranged positions corresponding to the six ball tracks 5 to be machined in the workpiece 3. The pawl and ratchet mechanism 47 embodies two diametrically opposed pawls 48 (see particularly FIGURE 5) which engages a ratchet member 49 of the fixture, the pawls 48 being loaded by springs 50 and mounted on a rotary pawl carrier 52 (see particularly FIGURE 7).

The pawl carrier 52 is formed as a pinion with peripheral teeth at 53, the rack teeth 54 being formed on the ram 55 of a double-acting power cylinder controlled by the aforesaid control means. Indexing movement of the pawl carrier 52 is limited by engagement of a nose surface 56 on each pawl 48 with a corresponding adjustable stop 57 the position of which is preset. The fixture 4 is accurately located in an indexed position by a spring-controlled and hydraulically operated latch mechanism 58 (see particularly FIGURE 6). The lower bearing 46 of the fixture is of the parallel roller type and the upper bearing 45 has crossed-axis rollers inclined alternately at 45° on either side of the bearing plane.

The latch mechanism 58 comprises a latch ring 59 dowelled to a sleeve 60 in which the fixture 4 is fixed and which rotates the bearings 45 and 46. Around its external periphery the latch ring 59 has six equiangularly spaced latching recesses such as 62 of similar form with mutually inclined side latching faces 63 for engagement with complementary side faces on a wedge-like nose 64 of a hook-like latch member 65 mounted on a fixed pivot 66. A hydraulic piston 67 under the control of the aforesaid control means engages a projection 68 from the latch member and is operative to move the latter to an unlatched position against a spring-loaded plunger 69 which engages the opposite side of the projection 68.

A plunger spring 70 provides the return force which returns the latch member 65 to the latching position and holds it in latching engagement with one of the recesses 62, the nose 64 engaging the latching faces 63 with a wedging action which provides positive latching of the ring 59 and hence, through the sleeve 60, of the fixture 4.

At the commencement of a complete machining cycle the machine tool is inoperative with the workhead yoke 7 in the retracted position shown in FIGURE 1. The workpiece 3 is slid into the holding fixture 4 and the automatic cycle started manually. The holding fixture 4 embodies pneumatic or hydraulic means (not shown) which act to grip the workpiece 3, and at the same time the retracting crankshaft 32 is turned to raise the workhead 1 to the operative position shown in FIGURE 2. The revolving cutter 72, which is driven by a cutting spindle motor 73 of the self-contained cutting head 13, is fed in to its "first pass depth," the workpiece 3 at this stage still being held clear of the cutter 72.

The pendulum generating motion now commences and the cutter 72 makes its first pass with the workpiece 3 swinging past the cutter 2. On reaching the cutter clearance at the end of the first ball track 5, the cutter 72 is fed forward by the feed cam 15 and the pendulum motion of the workhead 1 is decelerated so that it is brought to rest and then accelerated back to the substantially constant traversing speed, all within the limits of the cutter clearance. The return swing of the workhead 1 produces the second cutter pass. This action is repeated until the full depth of the track groove 5 has been machined.

The cutting cycle is so arranged that an even number of passes is made to the finishing cut, so that the cutter 72 ends up clear of the workpiece 3 when machining of a groove 5 is completed. The force of the feed ram 25 is then cancelled so that the cutter head is retracted rapidly by said subsidiary rams. This also enables the feed cam 15 to take up a fresh position for the next feed, and the workhead 1 is then indexed to turn the workpiece 3 to a new indexed position and the next cutting cycle begins. At the conclusion of all six cutting cycles, i.e. a complete machining cycle, the cutter spindle 2 in which the cutter 72 is mounted is completely retracted and the workhead assembly lowered to the retracted position of FIGURE 1 to enable the machined workpiece 3 to be removed and a fresh workpiece fitted.

I claim:

1. A machine tool for machining arcuate grooves in a workpiece, including a workhead mounted for swinging movement about a substantially horizontal axis above the centre of gravity of the workhead, the arrangement being such that a workpiece which is to be machined along an arcuate cutting path can be mounted on the workhead with the theoretical centre of said path located on said horizontal axis, and power-operated means provided to produce controlled swinging movement of the workhead on either side of a central vertical position during a machining operation, at a frequency which is substantially the same as its natural frequency when considered as a pendulum.

2. A machine tool for machining arcuate grooves in a workpiece, including a workhead according to claim 1, wherein the power-operated means comprise a hydraulically operated rack which meshes with a pinion on the workhead.

3. A machine tool for machining arcuate grooves in a workpiece, including a workhead according to claim 2, wherein the pinion is formed integrally with a trunnion of the workhead by which the latter is mounted for swinging movement.

4. A machine tool for machining arcuate grooves in a workpiece, including a workhead according to claim 2, wherein two racks and corresponding pinions are respectively provided one at each side of the workhead.

5. A machine tool for machining arcuate grooves in a workpiece, including a workhead according to claim 1, wherein control of the power-operated means is achieved by means of a control circuit embodying a control drum driven by and turning with the workhead.

6. A machine tool for machining arcuate grooves in a workpiece, including a workhead according to claim 5, wherein the control drum is mounted in rigid bearings to one side of the workhead and driven by the latter through a drive shaft embodying constant velocity universal joints.

7. A machine tool for machining arcuate grooves in a workpiece, including a workhead according to claim 1 wherein the workhead is in the form of a yoke with the intermediate link thereof provided with a work-holding fixture for mounting the workpiece between the side limbs of the yoke.

8. A machine tool for machining arcuate grooves in a workpiece, including a workhead according to claim 7, wherein workhead trunnions by means of which the workhead is mounted for swinging movement are themselves mounted on the side limbs of the workhead yoke.

9. A machine tool for machining arcuate grooves in a workpiece, including a workhead according to claim 1, wherein the workhead swings between two links which can themselves swing about a further horizontal axis between a retracted position and an operative machining position.

10. A machine tool for machining arcuate grooves in a workpiece, including a workhead according to claim 9, wherein in the operative position the links are located in position by a toggle arrangement against stops provided with a preset adjustment.

11. A machine tool for machining arcuate grooves in a workpiece, including a workhead according to claim 10, wherein the toggle arrangement is preloaded so that the two links are held with a predetermined force against the locating stops.

12. A machine tool for machining arcuate grooves in a workpiece, including a workhead according to claim 11, wherein the toggle arrangement comprises a separate toggle for each link, each toggle embodying a toggle link with a C-shaped portion the jaws of which are formed with measuring pads the spacing of which is indicative of the toggle preloading.

13. A machine tool for machining arcuate grooves in a workpiece, including a workhead according to claim 12, wherein each toggle is formed by said toggle link and a corresponding one of two cranks on a toggle crankshaft.

14. A machine tool for machining arcuate grooves in a workpiece, including a workhead according to claim 1, wherein a work-holding fixture is mounted on the workhead for rotary indexing movement about an axis which remains in a vertical plane during swinging movement of the workhead.

15. A machine tool for machining arcuate grooves in a workpiece, including a workhead according to claim 14, wherein the indexing axis is vertical in the freely hanging position of the workhead.

16. A machine tool for machining arcuate grooves in a workpiece, including a workhead according to claim 14, wherein a fluid-pressure operated pawl and ratchet mechanism carried by the workhead acts to produce indexing movement of the fixture.

17. A machine tool for machining arcuate grooves in a workpiece, including a workhead according to claim 14, wherein a fluid-pressure operated latch mechanism carried by the workhead positively latches the fixture in each indexed position.

18. A machine for forming arcuate grooves in the part-spherical internal surface of a workpiece, comprising a workhead supported on a horizontal axis, with the centre of gravity offset from said axis so as to be capable of swinging in both directions from a central vertical position with the centre of gravity below said horizontal axis, a workholding fixture mounted on said workhead to support a hollow spherical workpiece with the centre of the internal spherical surface of the workpiece positioned close to said horizontal axis, said workholding fixture being rotatable on said workhead about an indexing axis perpendicular to said horizontal axis, means for indexing said fixture, and means for holding said fixture in a selected indexed position during swinging movements of said workhead, power means including a hydraulic piston connected to said workhead to cause swinging movements thereof on both sides of the said central vertical position at a frequency substantially the same as the natural pendulum frequency of said workhead, a tool support carrying a rotary tool on an axis inclined at an acute angle from the vertical, and means for feeding said tool support towards and away from said workholding fixture.

19. A machine according to claim 18, in which the tool support is movable horizontally on guides, in a direction perpendicular to the said horizontal axis.

20. A machine according to claim 18, including means for causing relative vertical movement between said tool support, and a pair of support members carrying said workhead on said horizontal axis, to permit insertion and withdrawal of the workpiece from said workholding fixture.

21. A machine according to claim 20, in which said pair of support members carry horizontal bearings in which said workhead is pivotally mounted, and each support member is mounted for pivotal movement about a second horizontal axis parallel to but displaced from the first horizontal axis.

References Cited in the file of this patent
UNITED STATES PATENTS

| | | |
|---|---|---|
| 2,429,938 | Mansfield | Oct. 28, 1947 |
| 2,651,975 | Soloff | Sept. 15, 1953 |
| 2,808,764 | Markstrum | Oct. 8, 1957 |
| 2,956,452 | Dever | Oct. 18, 1960 |
| 3,026,778 | Fotsch et al. | Mar. 27, 1962 |